United States Patent
Myoen et al.

(10) Patent No.: US 10,027,270 B2
(45) Date of Patent: Jul. 17, 2018

(54) MOTOR CONTROL DEVICE (71) Applicant: Hitachi Automotive Systems, Ltd., Hitachinaka-shi, Ibaraki (JP)

(72) Inventors: Kohei Myoen, Hitachinaka (JP); Yusuke Kogure, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/548,859

(22) PCT Filed: Jan. 15, 2016

(86) PCT No.: PCT/JP2016/051066
§ 371 (c)(1),
(2) Date: Aug. 4, 2017

(87) PCT Pub. No.: WO2016/125559
PCT Pub. Date: Aug. 11, 2016

(65) Prior Publication Data
US 2018/0019697 A1 Jan. 18, 2018

(30) Foreign Application Priority Data
Feb. 6, 2015 (JP) .................................. 2015-022255

(51) Int. Cl.
G05D 23/275 (2006.01)
H02P 27/08 (2006.01)

(52) U.S. Cl.
CPC ................... H02P 27/08 (2013.01)

(58) Field of Classification Search
CPC ...................................................... H02P 27/08
(Continued)

(56) References Cited

U.S. PATENT DOCUMENTS

2009/0066384 A1* 3/2009 Suzuki .................... G06F 1/025
327/184
2010/0039056 A1* 2/2010 Kobayashi .............. H02M 7/48
318/400.35

(Continued)

FOREIGN PATENT DOCUMENTS

CN 102710165 A 10/2012
CN 103078589 A 5/2013

(Continued)

OTHER PUBLICATIONS

International Search Report (PCT/ISA/210) issued in PCT Application No. PCT/JP2016/051066 dated Apr. 26, 2016 with English translation (Four (4) pages).

(Continued)

Primary Examiner — Jorge L Carrasquillo
(74) Attorney, Agent, or Firm — Crowell & Moring LLP (57) ABSTRACT

To provide a motor control device capable of properly compensating the fluctuation in inverter output voltage during a dead time. The motor control device is for an inverter including switching elements composing upper and lower arms to convert a direct-current voltage to an alternating-current voltage and apply the alternating-current voltage to a motor thereby controlling a current of the motor to be a current target value, the motor control device including a dead time compensation unit that compensates fluctuation in inverter output voltage during a dead time with each switching between the upper and lower arms by a dead time compensation voltage, wherein the dead time compensation unit acquires an input parameter that determines a polarity of motor current during the dead time in a half-cycle of a fundamental wave of the motor current, and varies the dead time compensation voltage according to magnitude of the input parameter.

5 Claims, 8 Drawing Sheets (58) Field of Classification Search
USPC ...... 318/568.22, 632, 400.17, 400.26, 400.1, 318/400.13
See application file for complete search history.

(56) References Cited

U.S. PATENT DOCUMENTS

| | | | | |
|---|---|---|---|---|
| 2011/0273914 | A1* | 11/2011 | Kim | H02M 1/12 363/41 |
| 2012/0068646 | A1* | 3/2012 | Takamatsu | B60L 11/1803 318/400.26 |
| 2012/0206077 | A1* | 8/2012 | Yoneshima | H02P 6/185 318/400.33 |
| 2013/0088905 | A1* | 4/2013 | Lee | H02M 7/53875 363/131 |
| 2014/0306637 | A1* | 10/2014 | Wu | H02P 27/08 318/504 |
| 2014/0306638 | A1* | 10/2014 | Wu | H02P 27/08 318/504 |
| 2016/0068066 | A1 | 3/2016 | Kinomura et al. | |

FOREIGN PATENT DOCUMENTS

| | | | |
|---|---|---|---|
| JP | 64-60264 | A | 3/1989 |
| JP | 06133559 | A * | 5/1994 |
| JP | 9-308263 | A | 11/1997 |
| JP | 2011-239667 | A | 11/2011 |
| JP | 2014-212612 | A | 11/2014 |

OTHER PUBLICATIONS

Japanese-language Written Opinion (PCT/ISA/237) issued in PCT Application No. PCT/JP2016/051066 dated Apr. 26, 2016 (Five (5) pages).

* cited by examiner

FIG. 5A  MOTOR CURRENT (FOR ONE PHASE)

FIG. 5B  COMPENSATION ERROR = DIFFERENCE VOLTAGE

FIG. 5C  INTEGRAL TERM VOLTAGE

FIG. 8A POLARITY OF FUNDAMENTAL WAVE
MOTOR CURRENT (FOR ONE PHASE)

FIG. 8B TIMING TO MEASURE CURRENT POLARITY DURING DEAD TIME

FIG. 8C COUNTER THAT INCREMENTS ON POSITIVE MOTOR CURRENT

FIG. 8D COUNTER THAT INCREMENTS ON NEGATIVE MOTOR CURRENT

MOTOR CONTROL DEVICE

TECHNICAL FIELD

The present invention relates to a motor control device for compensating for the fluctuation in output voltage during a dead time in an inverter circuit.

BACKGROUND ART

There is known a technology for an inverter to generate an AC voltage by performing switching and apply the AC voltage to a motor thereby controlling the motor current. In such an inverter, to prevent a short circuit in upper and lower arms, a dead time in which the upper and lower arms are both off at the same time is provided. During this dead time, the fluctuation in inverter output voltage occurs; however, in PTL 1, there is described a technology for compensating for such fluctuation in inverter output voltage.

In PTL 1, there is described a configuration for calculating a phase of a fundamental wave of motor current on the basis of a dq-axis current command and a rotation angle of the motor, estimating the polarity of the motor current during a dead time on the basis of the phase, and outputting a dead time compensation voltage stored in a memory in a feed-forward control method.

Furthermore, in PTL 2, there is described a technology for determining the presence or absence of dead time compensation on the basis of the average value of motor current or the value of a fundamental wave and the polarity of the peak value of high-frequency ripple.

CITATION LIST

Patent Literature

PTL 1: Japanese Patent Laid-Open No. 64-60264
PTL 2: Japanese Patent Laid-Open No. 9-308263

SUMMARY OF INVENTION

Technical Problem

In PTL 1, with decreasing amplitude of a fundamental wave of motor current, the polarity of the motor current changes due to high-frequency content in the motor current regardless of the phase of the fundamental wave of the motor current. Accordingly, there is a problem that an estimate of the polarity of motor current used in dead time compensation and the actual polarity of the motor current are different temporarily, thereby the inverter fails to find a dead time compensation voltage correctly, which results in overcompensation.

In PTL 2, when the absolute value of motor current is small, dead time compensation is suspended according to the peak value of high-frequency ripple; therefore, the dead time compensation can be prevented from becoming overcompensation. However, the fluctuation in inverter output voltage during a dead time that occurs during the suspension of the compensation is not compensated; therefore, it may become a problem when a state in which the amplitude of the fundamental wave of the motor current is small, which is equivalent to a state in which the absolute value of the motor current is small, continues. For example, due to the suspension of dead time compensation, the fluctuation in inverter output voltage supposed not to be compensated is compensated by a feedback compensator that is not originally intended to do so, thereby the feedback compensator does not operate as originally intended and affects the transient characteristics when the amplitude of the fundamental wave of the motor current is controlled from small to large.

Solution to Problem

The invention according to claim 1 is a motor control device for an inverter including switching elements composing upper and lower arms to convert a direct-current voltage to an alternating-current voltage and apply the alternating-current voltage to a motor thereby controlling a current of the motor to be a current target value, the motor control device including a dead time compensation unit that compensates fluctuation in inverter output voltage during a dead time with each switching between the upper and lower arms by a dead time compensation voltage, wherein the dead time compensation unit acquires a parameter that determines a polarity of motor current during the dead time in a half-cycle of a fundamental wave of the motor current, and varies the dead time compensation voltage according to magnitude of the parameter.

Advantageous Effects of Invention

According to the present invention, even on the occurrence of a state in which the polarity of a fundamental wave of motor current and the polarity of motor current during a dead time are different, the fluctuation in inverter output voltage during the dead time can be compensated properly.

DESCRIPTION OF EMBODIMENTS

Embodiments of the present invention are described below with reference to drawings.

First Embodiment

Figure 1:
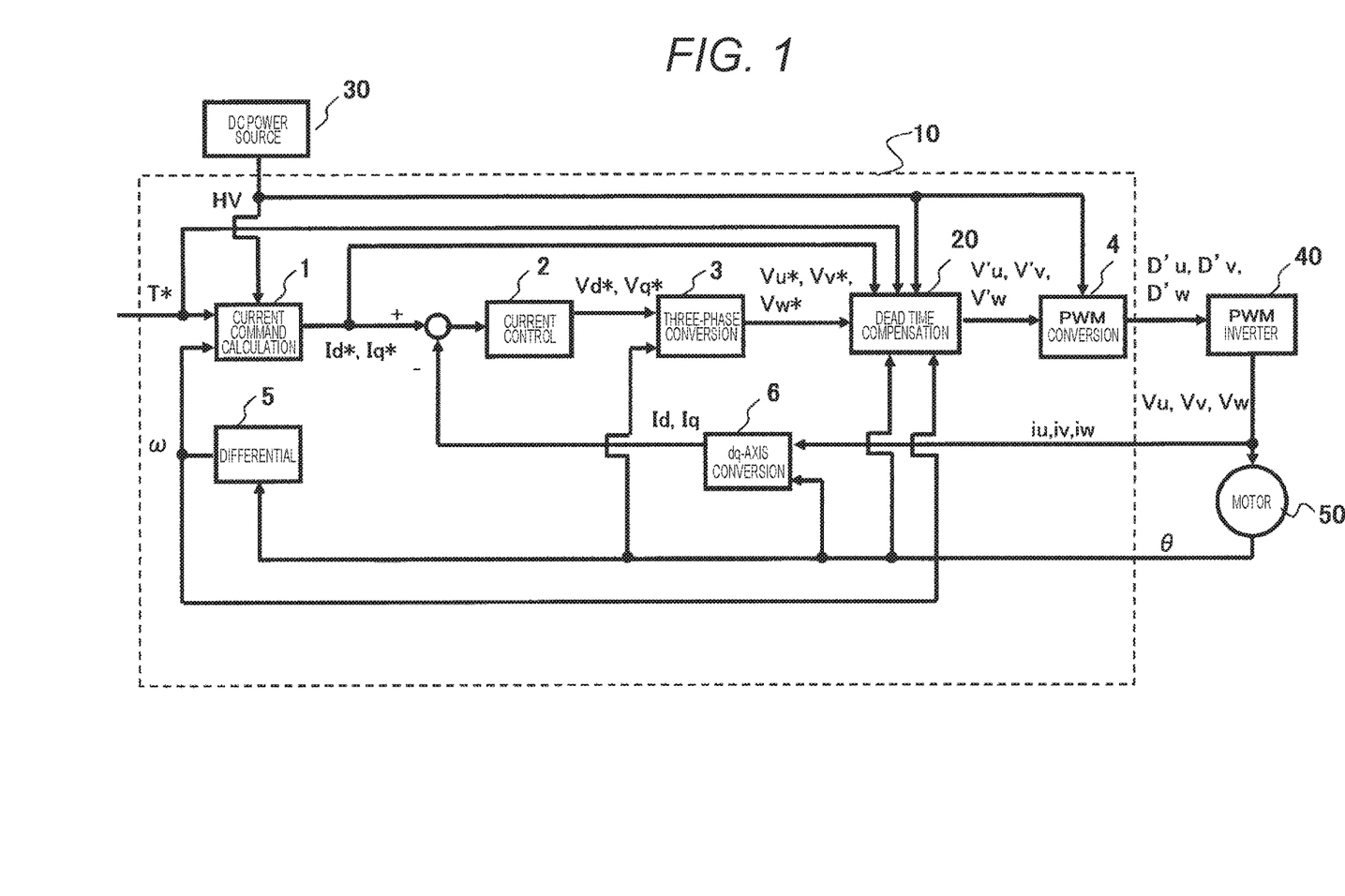
FIG. 1 is a block diagram showing a first embodiment of a motor control device according to the present invention.

FIG. 1 is a block diagram illustrating a first embodiment of a motor control device according to the present invention. A control unit 10 shown in FIG. 1 corresponds to the motor control device in the present embodiment, and FIG. 1 shows the case where the motor control device is applied to a motor system. The voltage of a DC power source 30 is converted to three-phase AC voltages Vu, Vv, Vw by a PWM inverter 40, and the three-phase AC voltages Vu, Vv, Vw are applied to a motor 50. The PWM inverter 40 generates the three-phase AC voltages Vu, Vv, Vw on the basis of PWM signals D'u, D'v, D'w input from the control unit 10. Three-phase motor currents flowing in the motor 50 are controlled by these PWM signals D'u, D'v, D'w, respectively.

The control unit 10 includes a current command calculation unit 1, a current control unit 2, a three-phase conversion unit 3, a PWM conversion unit 4, a differential unit 5, a dq-axis conversion unit 6, and a dead time compensation unit 20.

The current command calculation unit 1 calculates a d-axis current target value Id* and a q-axis current target value Iq* from a torque command value T* given from the outside, a rotation speed ω of the motor 50 calculated by the differential unit 5, and a voltage HV of the DC power source 30. Incidentally, the torque command value T* is a signal to specify the output torque of the motor 50.

The current control unit 2 calculates proportional and integral terms related to feedback control on the basis of deviations between the d- and q-axis current target values Id* and Iq* from the current command calculation unit 1 and d- and q-axis current values Id and Iq to be described later. Its result is output as a d-axis voltage command value Vd* and a q-axis voltage command value Vq*. Incidentally, in the calculation of d- and q-axis voltage command values Vd* and Vq*, decoupling control can be applied as needed.

The three-phase conversion unit 3 converts the input d- and q-axis voltage command values Vd* and Vq* to a U-phase voltage command value Vu*, a V-phase voltage command value Vv*, and a W-phase voltage command value Vw* that are three-phase voltage command values on the basis of a rotor phase θ of the motor 50. Incidentally, the rotor phase θ of the motor 50 is detected by using a position sensor (not shown) such as a resolver or an encoder.

The PWM conversion unit 4 calculates a U-phase pulse width D'u, a V-phase pulse width D'v, and a W-phase pulse width D'w from dead-time-compensation-added three-phase voltage command values V'u, V'v, V'w output from the dead time compensation unit 20, and outputs the U-phase pulse width D'u, the V-phase pulse width D'v, and the W-phase pulse width D'w as PWM signals. Incidentally, the details of the dead time compensation unit 20 will be described later. The differential unit 5 calculates a rotor angular velocity ω of the motor 50 by differentiating the rotor phase θ.

The dq-axis conversion unit 6 converts three-phase motor currents iu, iv, iw detected by a current sensor (not shown) to a d-axis current value Id and a q-axis current value Iq on the basis of the rotor phase θ. Incidentally, the three-phase motor currents iu, iv, iw include a fundamental wave and high-frequency ripple caused by PWM switching.

Figure 2:
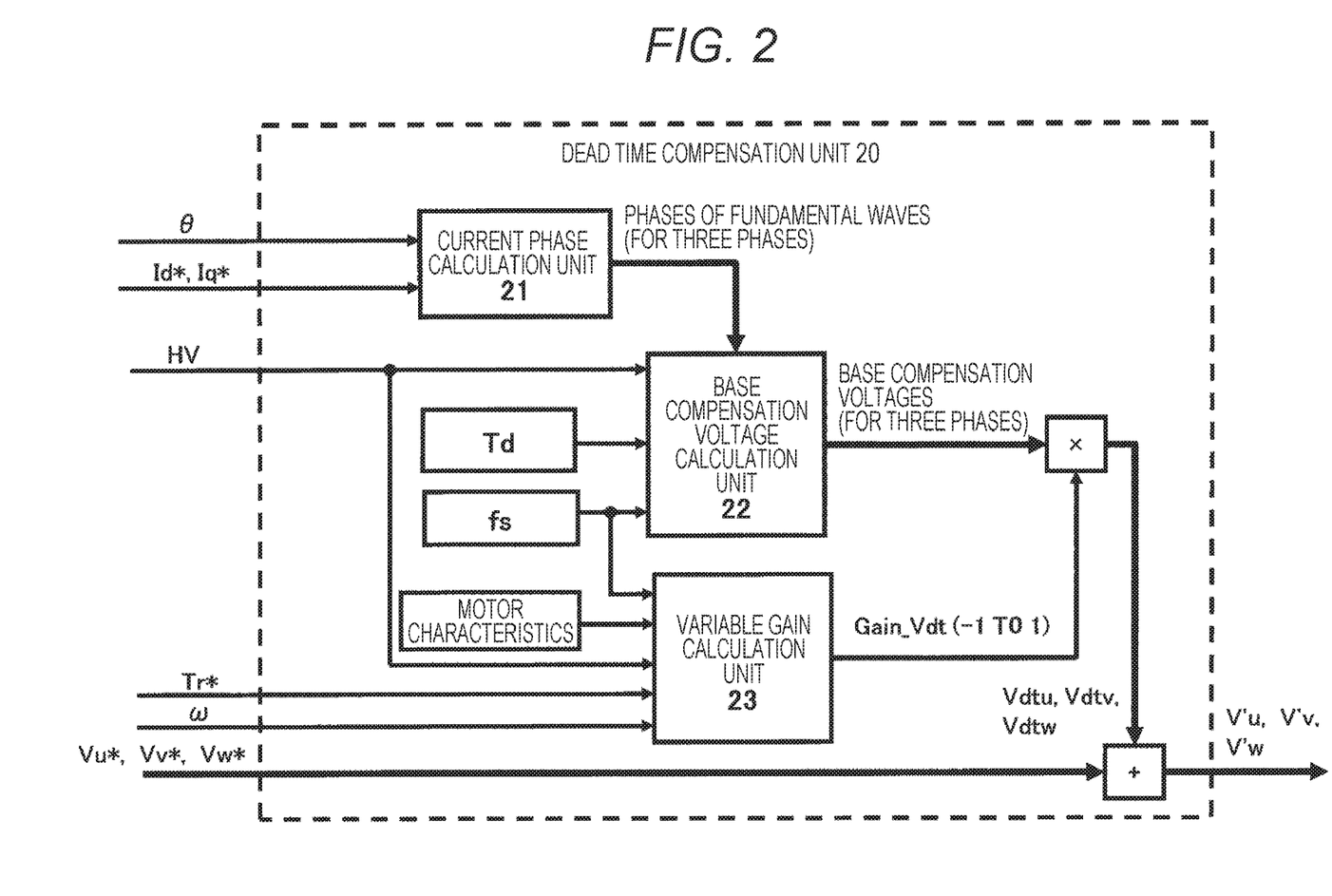
FIG. 2 is a block diagram showing the details of a dead time compensation unit.

Subsequently, the dead time compensation unit 20 that is a feature of the present embodiment is described in detail below. As shown in FIG. 2, the dead time compensation unit 20 includes a current phase calculation unit 21, a base compensation voltage calculation unit 22, and a variable gain calculation unit 23. In the dead time compensation unit 20, dead-time-compensation-added three-phase voltage command values V'u, V'v, V'w are calculated by adding dead time compensation voltages Vdtu, Vdtv, Vdtw to three-phase voltage command values V*u, V*v, V*w, respectively.

The current phase calculation unit 21 calculates respective phases of fundamental waves of three-phase motor currents for three phases from a rotor phase θ and d- and q-axis current target values Id* and Iq*. For example, when a zero-crossing, falling point of U-phase induced voltage is 0 degrees on dq-axis coordinates, and the q-axis is a direction of U-phase induced voltage, and the d-axis is perpendicular to the q-axis, a phase of a fundamental wave of U-phase current is found by adding a phase of a current vector generated from the d- and q-axis current target values Id* and Iq* to the rotor phase θ. Then, values shifted from the phase of the fundamental wave of the U-phase current by 120 degrees and 240 degrees are phases of fundamental waves of V- and W-phase currents, respectively.

The base compensation voltage calculation unit 22 calculates the magnitude of base compensation voltage from input parameters shown in FIG. 2 in addition to the above-described phases of the fundamental waves on the basis of the following equation (1). Then, the base compensation voltage calculation unit 22 calculates base compensation voltages for three phases so that the base compensation voltages each have the same polarity as that of the fundamental wave of the corresponding phase motor current. Incidentally, in equation (1), HV denotes a voltage value [V] of the DC power source 30; Td denotes a dead time [s]; and fs denotes a PWM carrier frequency [Hz].

$$\text{(Magnitude of base compensation voltage)} = HV \times Td \times fs \tag{1}$$

The magnitude of the average value of inverter output voltage fluctuation during the dead time in one cycle of the carrier is represented by equation (1), and its polarity is opposite to the polarity of motor current. The polarity of a fundamental wave of each phase motor current is positive when the phase the fundamental wave of the phase motor current is between 0 and 108 degrees, and is negative when the phase the fundamental wave of the phase motor current is between 180 and 360 degrees.

The base compensation voltage found in this way is calculated on the presupposition that the polarity of a fundamental wave of motor current coincides with the polarity of motor current during a dead time. Accordingly, when the polarity of a fundamental wave of motor current actually coincides with the polarity of motor current during the dead time, the fluctuation in inverter output voltage during the dead time can be compensated without an error.

However, on the occurrence of a situation in which the polarity of motor current during the dead time does not coincide with the polarity of a fundamental wave of motor current, an error is generated between the above-described base compensation voltage and the fluctuation in inverter output voltage during the dead time. Accordingly, in the dead time compensation unit 20 in the present embodiment, so as not to generate such an error, the base compensation voltage output from the base compensation voltage calculation unit 22 is multiplied by Gain_Vdt calculated by the variable gain calculation unit 23, thereby the base compensation voltage is configured to be variable.

Here, before description of the details of the variable gain calculation unit 23, the above-mentioned generation of an error is described with reference to FIGS. 4 and 5. In conventional dead time compensation, to compensate the fluctuation in inverter output voltage during the dead time, except for around the zero crossing of a fundamental wave of motor current, the magnitude of compensation voltage is always constant over the half-cycle of the motor current, and its polarity is the same polarity as the fundamental wave of the motor current. Then, around the zero crossing of the fundamental wave of the motor current, the amount of the compensation is reduced, or the compensation is suspended. This is because the fluctuation in inverter output voltage during the dead time depends on the polarity of motor current during the dead time.

Figure 4A:
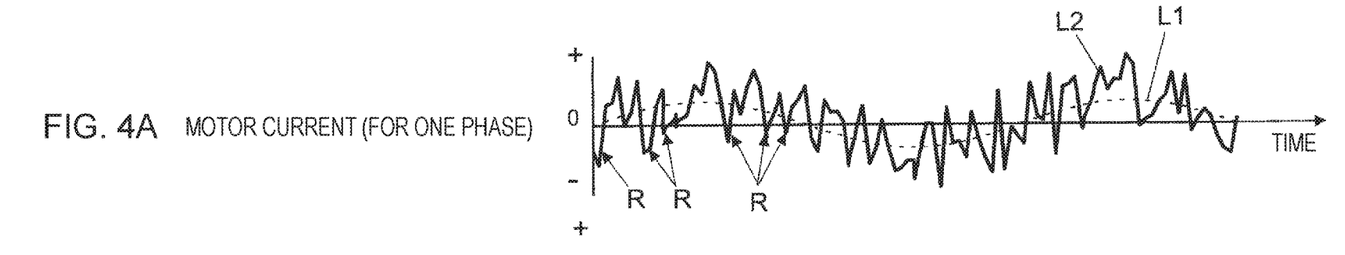
FIGS. 4A-4D are diagrams explaining difference voltage.

However, as shown in FIG. 4(a), when the amplitude of a fundamental wave L1 of motor current is small, and the ripple amplitude caused by a high-frequency component of a motor current L2 is large, there arises a problem that the base compensation voltage is not calculated properly. This is because a value of voltage to be compensated differs between the case where the polarity of the motor current L2 during the dead time is the same as the polarity of the fundamental wave L1 and the case where the polarity of the motor current L2 during the dead time is different from the polarity of the fundamental wave L1. Looking at the first half-cycle in an example shown in FIG. 4(a), portions of the motor current L2 indicated by a code R have the polarity opposite to the polarity of the fundamental wave L1.

Figure 4B:
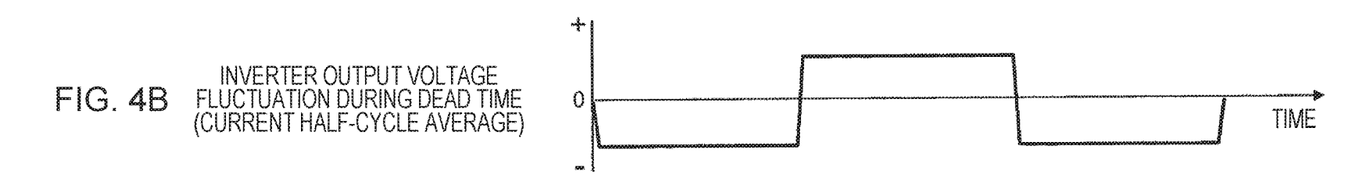
Figure 4C:
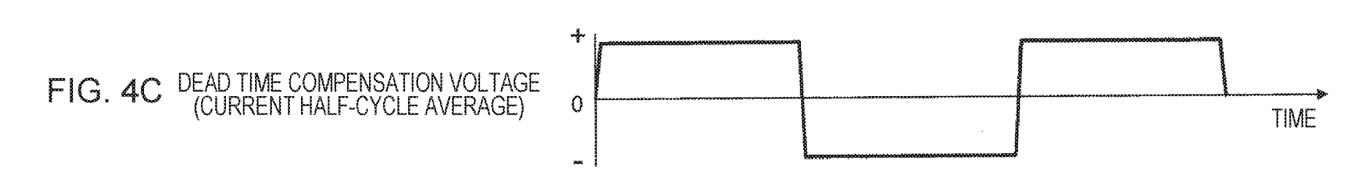
Figure 4D:
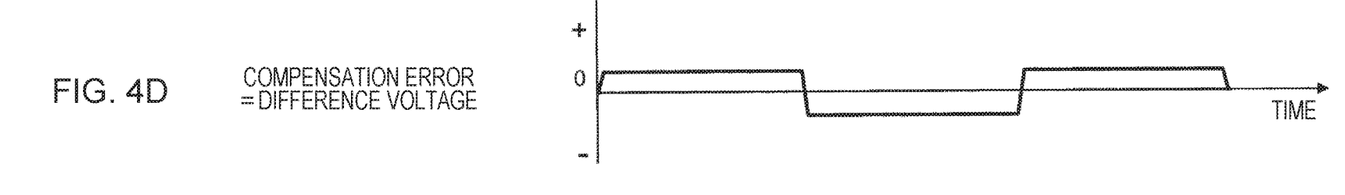

In the case of the motor current shown in FIG. 4(a), a difference voltage as shown in FIG. 4(d) is generated between the value obtained by averaging the fluctuation in inverter output voltage during the dead time over the half-cycle of the fundamental wave L1 (see FIG. 4(b)) and the value obtained by averaging the dead time compensation voltage over the half-cycle (see FIG. 4(c)). That is, if the base compensation voltage output from the base compensation voltage calculation unit 22 is used without change, in the case as shown in FIG. 4(a), the fluctuation in inverter output voltage during the dead time cannot be compensated properly.

Figure 5A:
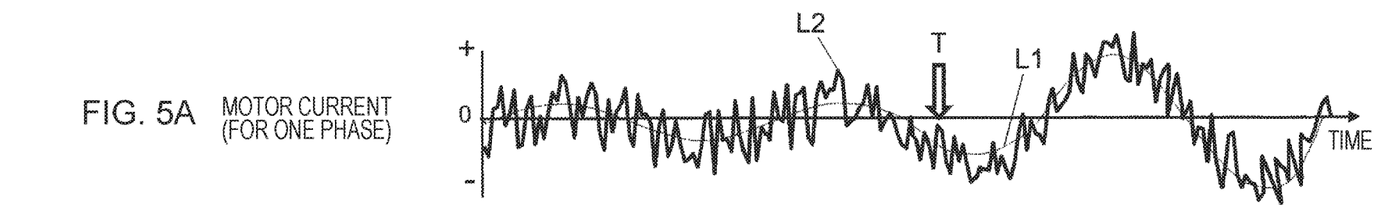
FIGS. 5A-5C are diagrams explaining integral term voltage.
Figure 5B:
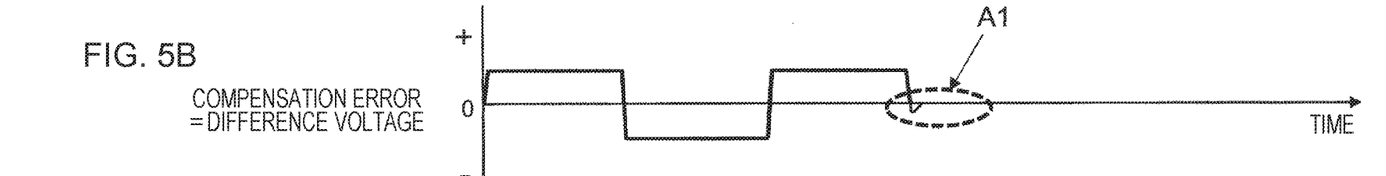

Conventionally, such a stationary difference voltage is compensated by an integral term voltage of feedback control for controlling the motor current to be a current command value, for example, like FIG. 5. In the case of a motor current L2 shown in FIG. 5(a), after the point of time indicated by an arrow T, the amplitude of a fundamental wave L1 starts increasing. As a result, even if ripple caused by a high-frequency component is included in the motor current L2, after the 1.5 cycles viewed from time 0, the polarity of the motor current L2 during the dead time and the polarity of the fundamental wave L1 become the same. Accordingly, as shown in FIG. 5(b), after the 1.5 cycles, the difference voltage becomes zero.

Figure 5C:
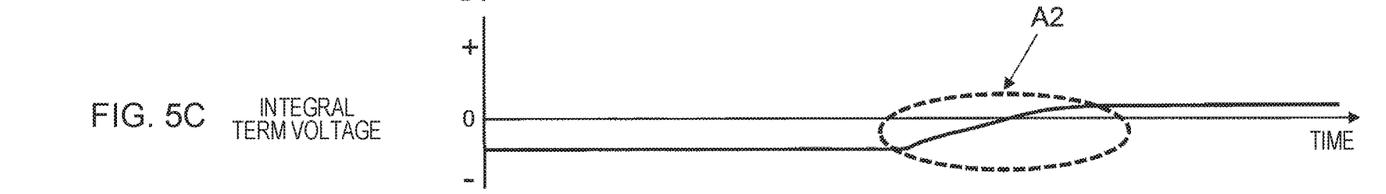

FIG. 5(c) shows the integral term voltage. When a difference voltage has been generated as shown in FIG. 5(b), the integral term voltage as shown in FIG. 5(c) is calculated by the current control unit 2 in FIG. 1, and feedback control is performed so that the difference voltage is reduced. However, this difference voltage is eliminated as the amplitude of the fundamental wave of the motor current becomes larger than the amplitude of the high-frequency component. Accordingly, like regions indicated by codes A1 and A2, when changes in the integral term voltage cannot catch up with changes in the amplitude of the fundamental wave of the motor current, the integral term voltage becomes a factor that worsens the responsiveness of the motor current.

In a state in which the difference voltage is generated from the beginning as shown in FIG. 5(b), the integral term voltage compensates this. If the current target value is increased, and the proportional term of feedback control increases the amplitude of the fundamental wave of the motor current to a certain point, the difference voltage becomes almost 0 [V]; however, it cannot be immediately changed to an appropriate value from a state in which the integral term voltage is accumulated. Accordingly, after the fundamental wave of the motor current has reached a certain value or higher, the motor current does not respond at an expected time constant.

In the present embodiment, by the introduction of the variable gain calculation unit 23, the dead time compensation voltages Vdtu, Vdtv, Vdtw are configured to be variable on the basis of the amplitude of high-frequency ripple amplitude of motor current that determines the polarity of the motor current during the dead time and the amplitude of a fundamental wave. As a result, the difference voltage is reduced, and high-accuracy dead time compensation is possible.

(Detailed Description of the Variable Gain Calculation Unit 23)

The variable gain calculation unit 23 has a Gain_Vdt map for determining Gain_Vdt (=0 to 1). On the Gain_Vdt map, Gain_Vdt associated with various values of the input parameters shown in FIG. 2 are mapped. The variable gain calculation unit 23 outputs Gain_Vdt according to the values of the input parameters.

As will be described later, these input parameters are the factors determining the amplitude of high-frequency ripple of motor current, and the current polarity during the dead time is determined by these values and the amplitude of a fundamental wave of the motor current. Then, when multiple pieces of Gain_Vdt to multiple sets of input parameters are compared, an input parameter set having a higher rate at which the current polarity during the dead time is the same polarity as the fundamental wave, a value of Gain_Vdt is closer to 1. Furthermore, like the fifth half-cycle in FIG. 5(c), when the current polarity during the dead time is all the same polarity as the fundamental wave, Gain_Vdt=1. On the contrary, an input parameter set having a higher rate at which the current polarity during the dead time is the polarity opposite to the polarity of the fundamental wave, a value of Gain_Vdt is closer to −1; when the current polarity during the dead time is all the polarity opposite to the polarity of the fundamental wave, Gain_Vdt=−1. Moreover, when the rate at which the current polarity during the dead time is the same polarity as the fundamental wave equals the rate at which the current polarity during the dead time is the polarity opposite to the polarity of the fundamental wave, Gain_Vdt=0. That is, Gain_Vdt is set to a value from −1 to +1.

In this way, in the variable gain calculation unit 23, Gain_Vdt corresponding to input parameters that are factors determining the polarity of motor current during the dead time are selected from the Gain_Vdt map. Then, values obtained by multiplying the base compensation voltage by the selected Gain_Vdt are added as dead time compensation voltages Vdtu, Vdtv, Vdtw to three-phase voltage command values V*u, V*v, V*w, respectively. That is, the dead time compensation voltages Vdtu, Vdtv, Vdtw are the variable amount that varies according to input parameters.

(Description of Input Parameters)

Input parameters that are factors determining the polarity of motor current during the dead time in the half-cycle of the motor current are derived from a relational expression between motor voltage and motor current shown in the following equation (2). In equation (2), Vd and Vq denote d- and q-axis motor voltages, respectively; ω denotes a motor rotation speed; Ld and Lq denote d- and q-axis motor inductances, respectively; R denotes a motor phase resistance; Id and Iq denote d- and q-axis motor currents, respectively; ψa denotes a motor interlinkage flux; and s denotes a differential operator.

[Formula 1]

$$\begin{bmatrix} I_d(s) \\ I_q(s) \end{bmatrix} = \begin{bmatrix} \dfrac{V_d(s) + L_q \omega I_q(s)}{R} \times \dfrac{1}{1 + s\dfrac{L_d}{R}} \\ \dfrac{V_q(s) - L_d \omega I_d(s) - \omega \psi_a}{R} \times \dfrac{1}{1 + s\dfrac{L_q}{R}} \end{bmatrix} \quad (2)$$

Equation (2) represents a relationship between motor voltage and motor current in dq-axis coordinates, where the relationship between the two represented in the time domain is represented in the complex domain by Laplace transform. It can be found out from equation (2) that the d-axis motor current Id is a value obtained by dividing [Vd+Lq×ω×Iq (an induced voltage component] that is a voltage component by the motor phase resistance R, and varies according to a time constant Ld/R. Furthermore, the q-axis motor current Iq is a value obtained by dividing [Vq−Ld×ω×Id (an induced voltage component)−ω×ψa (an induced voltage component)] that is a voltage component by the motor phase resistance R, and varies according to a time constant Lq/R.

In equation (2), the d- and q-axis motor voltages Vd and Vq are a pulsing voltage that the voltage applied to the motor 50 as three-phase PWM is converted to d- and q-axis coordinates. This results in generating high-frequency ripple in the d- and q-axis motor currents Id and Iq and also generating high-frequency ripple in respective phase currents iu, iv, iw of the motor 50 that the d- and q-axis motor currents Id and Iq are converted in three phases. The amplitude of the high-frequency ripple is determined by the width and height of this pulsing voltage. The width of pulse depends on the magnitude of effective values of the d- and q-axis motor voltages Vd and Vq and the carrier frequency fs, and the height of pulse depends on the voltage value HV of the DC power source 30.

In this way, the parameters described in equation (2), the above-mentioned DC power supply voltage HV, and the above-mentioned carrier frequency fs are the factors determining the amplitude of high-frequency ripple of motor current, and the current polarity during the dead time is determined by these values and the amplitude of a fundamental wave of the motor current.

The d- and q-axis motor currents Id and Iq and the d- and q-axis motor voltages Vd and Vq in equation (2) are equivalent to the d- and q-axis current target values Id* and Iq* and the d- and q-axis voltage command values Vd* and Vq*, respectively. The d- and q-axis voltage command values Vd* and Vq* are determined from the d- and q-axis current target values Id* and Iq* and the induced voltage components in equation (2). The fundamental wave of the motor current depends on the d- and q-axis current target values Id* and Iq*. Accordingly, the following parameters can be the factors determining the polarity during the dead time, i.e., the input parameters of the variable gain calculation unit 23.

(P1) Motor rotation speed ω
(P2) d- and q-axis current target values Id*, Iq*
(P3) Power supply voltage HV
(P4) Carrier frequency fs
(P5) Motor characteristics Ld, Lq, R, ψa Incidentally, the d- and q-axis motor currents Id and Iq are described to be equivalent to the d- and q-axis current target values Id* and Iq*; however, since the two have a difference transiently, values that the d- and q-axis current target values Id* and Iq* are filtered to eliminate the transient difference can be used.

Furthermore, since the d- and q-axis current target values Id* and Iq* are determined from a torque command value T*, the motor rotation speed ω, and the power supply voltage HV, the torque command value T* can be used as an input parameter instead of the d- and q-axis current target values Id* and Iq*. Also in this case, as is the case in the d- and q-axis current target values Id* and Iq*, a value that the torque command value T* is filtered can be used. Incidentally, in an example shown in FIG. 2, a torque command value Tr* is used as an input parameter.

(Method for Calculating Components of Gain_Vdt Map)

Figure 3:
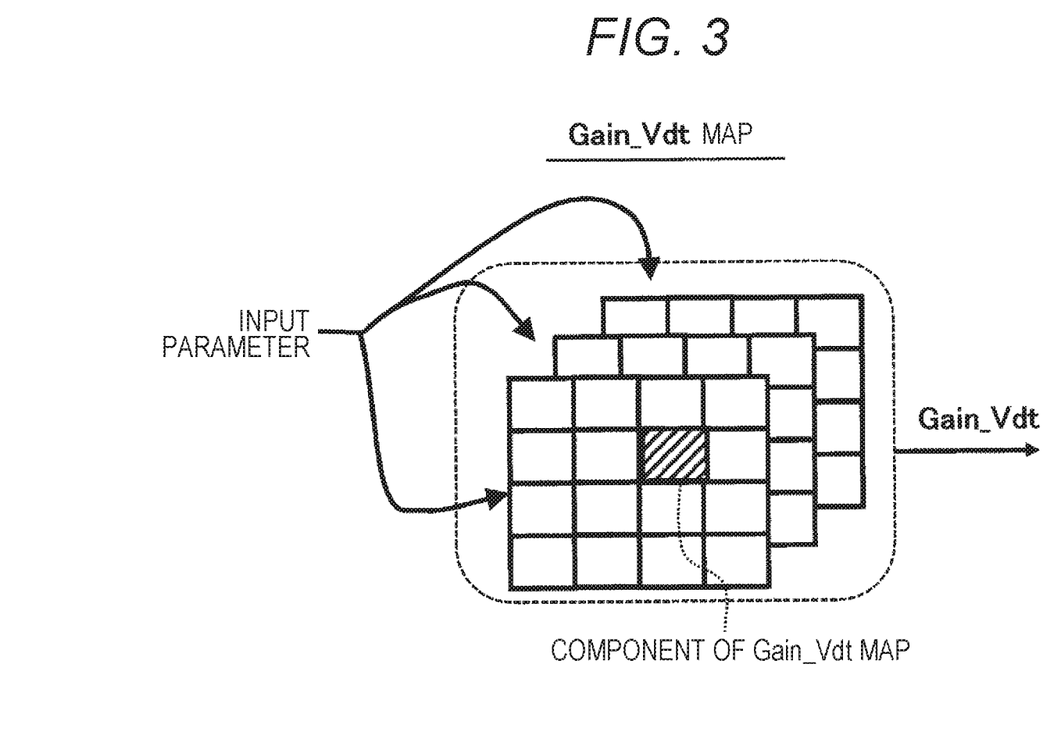
FIG. 3 is a diagram showing an example of a Gain_Vdt map.

Subsequently, a method for calculating components (Gain_Vdt) of the Gain_Vdt map shown in FIG. 3 is described. First, Gain_Vdt=1 is set, and the base compensation voltage is put into a state of being multiplied as dead time compensation voltages Vdtu, Vdtv, Vdtw by three-phase voltage command values Vu*, Vv*, Vw*. Then, the above-described sets of input parameters are sequentially fixed to values in various possible operating states in controlling the current of the motor 50, and state quantities (d- and q-axis voltage command values Vd* and Vq*, d- and q-axis motor voltages Vd and Vq, and base compensation voltage) required for motor current control to the respective values are acquired.

In a state in which there is no difference voltage between inverter output voltage fluctuation and base compensation voltage (a state in which there is no ripple current causing the polarity opposite to that of a fundamental wave), the d- and q-axis voltage command values Vd* and Vq* equal values obtained by solving equation (2) with Vd and Vq in a steady state. That is, the d- and q-axis voltage command values Vd* and Vq* are increased (or decreased) by a compensation by the dead time compensation block 20; however, the dead time is set on the PWM conversion by the PWM conversion unit 4, so the compensation is offset by the voltage fluctuation caused by the dead time when applied to the motor 50 eventually. As a result, Vd and Vq equal to the d- and q-axis voltage command values Vd* and Vq* are applied to the motor 50.

On the other hand, in a state in which there is a difference voltage, the difference voltage is included in the d- and q-axis voltage command values Vd* and Vq*. That is, when the magnitude of dead time compensation voltages Vdtu, Vdtv, Vdtw is different from the voltage fluctuation caused by the dead time, and a difference voltage is generated, the d- and q-axis motor voltages Vd and Vq applied to the motor 50 are different from the d- and q-axis voltage command values Vd* and Vq* by a value corresponding to the difference voltage. In feedback control, the d- and q-axis motor currents Id and Iq are controlled to be the d- and q-axis current target values Id* and Iq*, so the difference voltage affects the d- and q-axis voltage command values Vd* and Vq*. Accordingly, the magnitude of the difference voltage can be found by the following equation (3).

$$\text{Magnitude of difference voltage} = \sqrt{\{(Vd^*-Vd)^2 + (Vq^*-Vq)^2\}} \quad (3)$$

In equation (3), Vd and Vq are values obtained by solving above-described equation (2) in a steady state like the following equation (4).

$$Vd = (Id(s) \times R) - (Lq \times \omega \times Iq(s))$$

$$Vq = (Iq(s) \times R) + (Ld \times \omega \times Id(s)) + (\omega \times \psi a) \quad (4)$$

Figure 6:
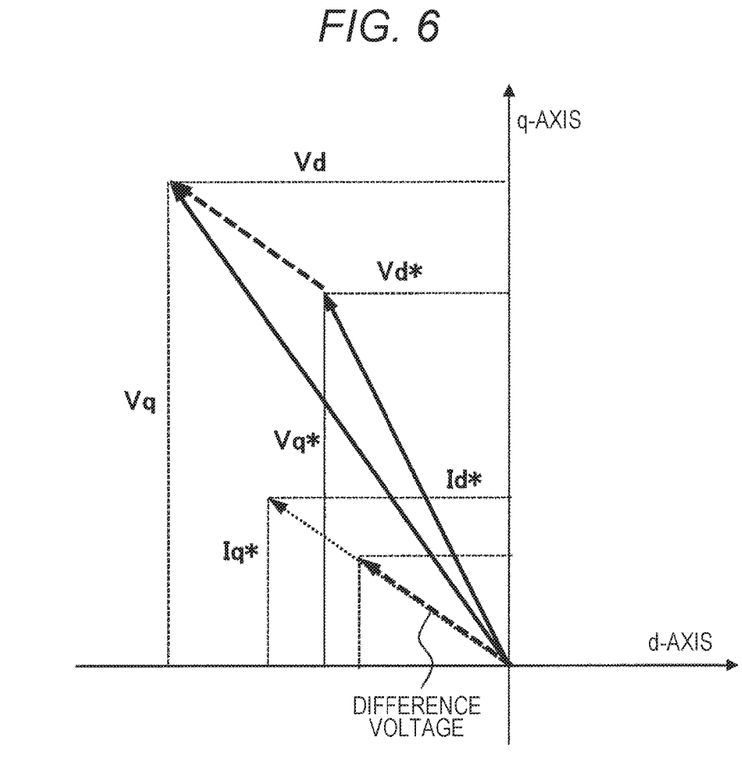
FIG. 6 is a diagram explaining the difference voltage on d-q coordinates.
Figure 7A:
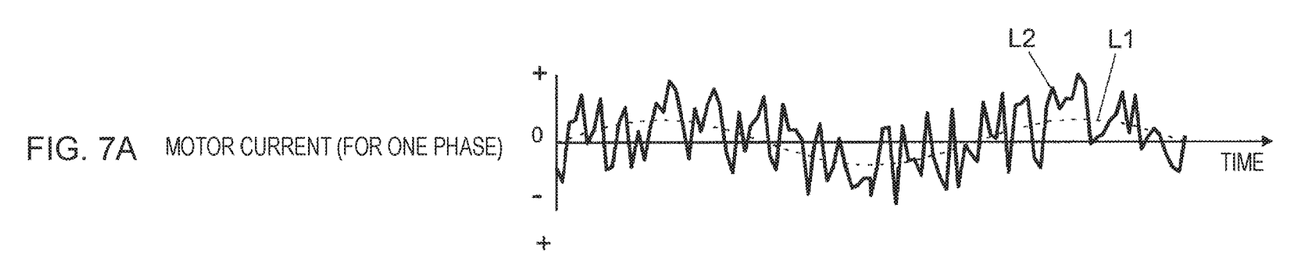
FIGS. 7A-7D are diagrams explaining dead time compensation voltage in the first embodiment.
Figure 7B:
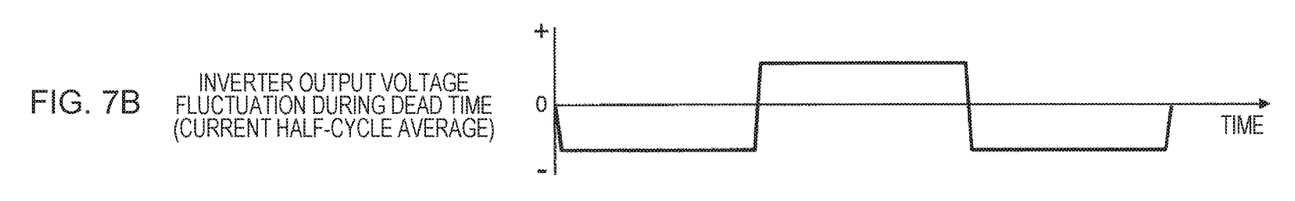
Figure 7C:
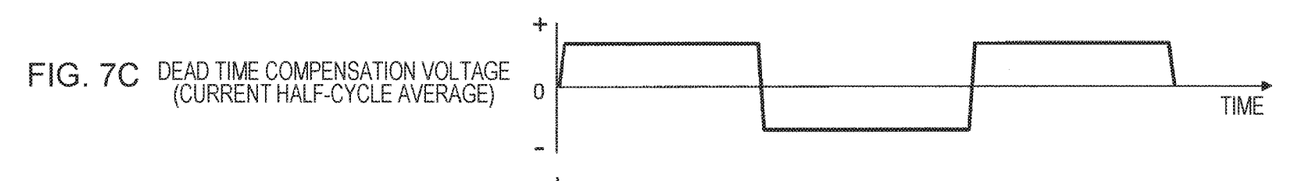
Figure 7D:
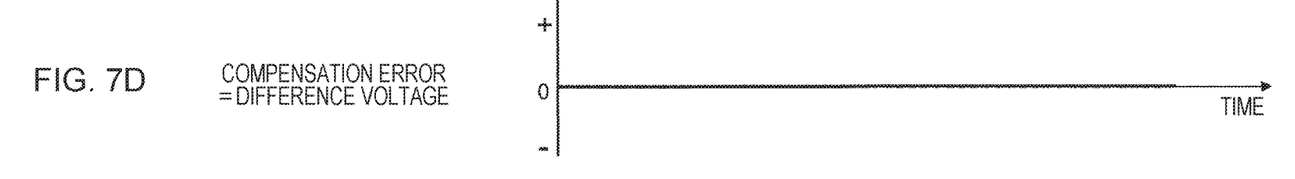
Figure 8A:
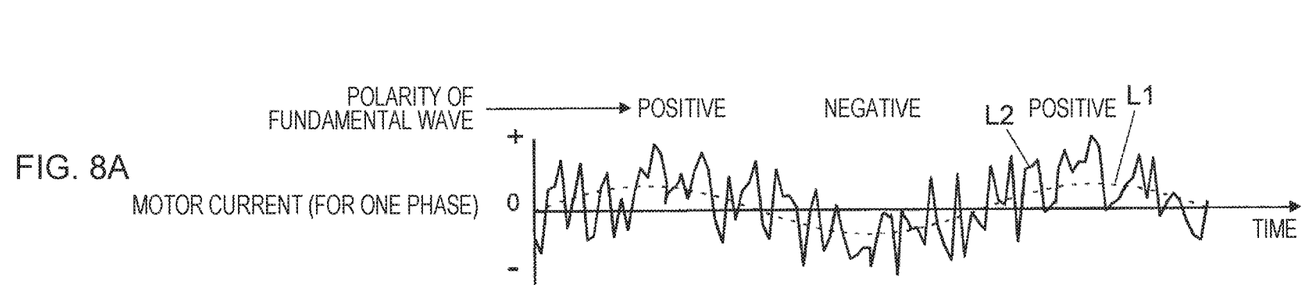
FIGS. 8A-8D explaining a second embodiment.
Figure 8B:
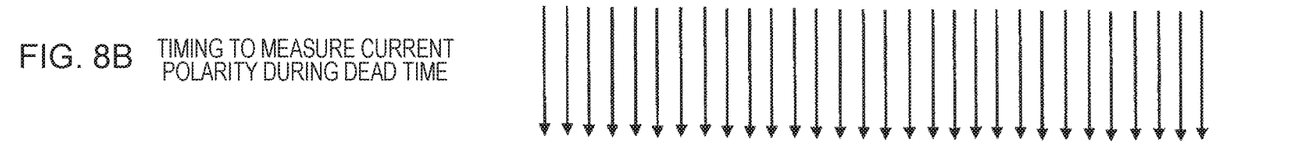
Figure 8C:
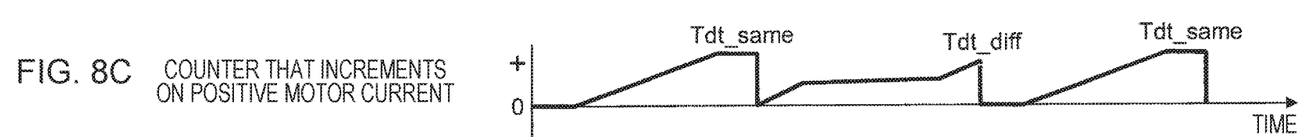
Figure 8D:
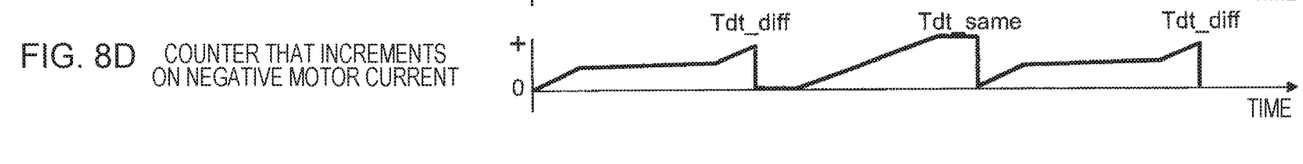

As shown in FIG. 4(d), the polarity of the difference voltage varies every half-cycle of a fundamental wave of motor current; however, in d-q coordinate axes shown in FIG. 6, the difference voltage is a DC voltage component generated in the same direction (the same phase) as the d- and q-axis current target values Id* and Iq*, and its magnitude is almost equal to a value obtained by averaging the difference voltage over the half-cycle of motor current. In the actual operating state, to control the motor current to be the d- and q-axis current target values Id* and Iq*, the d- and q-axis motor voltages Vd and Vq like FIG. 6 need to be applied to the motor.

On the other hand, the output of the current control unit 2 becomes Vd* and Vq* shown in FIG. 6. This is because in a state of base compensation voltage, it is equivalent to the difference voltage being output with the d- and q-axis voltage command values Vd* and Vq* added in the dead time compensation unit 20.

Accordingly, components of the Gain_Vdt map only has to be found so that the magnitude of "base compensation voltage×(1−Gain_Vdt)" in the actual operating state equals the magnitude of the difference voltage found by equation (3). In this case, it is represented by Gain_Vdt=1−(difference voltage)/(base compensation voltage). For example, when difference voltage=0, Gain_Vdt=1. Furthermore, when difference voltage>0, Gain_Vdt<1. By giving sets of input parameters corresponding to various operating states and acquiring Gain_Vdt as described above, the Gain_Vdt map in FIG. 3 is obtained.

Incidentally, if the amplitude of a fundamental wave of motor current is increased when the values of input parameters have been changed, Gain_Vdt becomes closer to 1. Accordingly, components of the Gain_Vdt map only has to be found in a range that can reduce the difference voltage sufficiently.

When a voltage corresponding to the induced voltage component including ω in equation (4) is compensated by decoupling control in the current control unit 2, and, in a range in which components of the Gain_Vdt map are found, Id(s)×R and Iq(s)×R in equation (4) are negligible small with respect to the difference voltage, the magnitude of difference voltage only has to be found from the following equation (5). In this case, the integral term voltage in d-q coordinate axes only has to be observed. This is because the difference voltage is compensated by the voltage of the integral term. The integral term voltage is obtained in the current control unit 2 in FIG. 1.

(Magnitude of difference voltage)=√($d$-axis integral term^2+$q$-axis integral term^2)  (5)

Incidentally, the eventual components of the Gain_Vdt map can be obtained by measuring components of the Gain_Vdt map multiple times every half-cycle of a fundamental wave of motor current and averaging results of the measurements. By doing this, the accuracy of Gain_Vdt can be improved. Furthermore, an interval in which the parameters are varied only has to be set to an interval in which, of values that can be obtained in controlling the current of the motor 50, Gain_Vdt capable of reducing the difference voltage sufficiently can be calculated from the Gain_Vdt map.

Components of the Gain_Vdt map can be calculated in advance, and then these can be stored as the Gain_Vdt map in the variable gain calculation unit 23.

Moreover, instead of preparing the Gain_Vdt map in advance, the Gain_Vdt map can be formed when the motor is used in such a manner that, as for a state occurred in the course of controlling the current of the motor, components of the Gain_Vdt map are calculated each time it occurs, and values of the components are stored. By repeating the calculation of Gain_Vdt in various operating states, components of the Gain_Vdt map about all the possible states are stored eventually.

For example, the initial value of each component of the Gain_Vdt map is set to 1. When a certain input parameter has been input while the motor is in use, the Gain_Vdt calculating process as described above is performed on the input parameter. A result of the calculation (Gain_Vdt) is stored as a component of the Gain_Vdt map corresponding to the input parameter.

Furthermore, also in the case where the Gain_Vdt map is prepared in advance, Gain_Vdt having stored in advance can be overwritten with Gain_Vdt obtained when the motor is used as described above.

To explain specifically, for example, a component (Gain_Vdt having been set in advance) corresponding to a given input parameter of the Gain_Vdt map is assumed to be G1. If the difference voltage when this G1 has been used is that difference voltage≠0, G2 is calculated from an equation of "base compensation voltage×(G1−G2)=difference voltage". This G2 is a newly-obtained component, and G2 is stored instead of G1. Needless to say, when difference voltage=0, G2=G1, and the component corresponding to the given input parameter of the Gain_Vdt map is maintained constant.

For example, when the motor characteristics (Ld, Lq, R, ψa) that is one of input parameters have varied with age, when the motor is used, Gain_Vdt is overwritten as described above, thereby the accuracy improvement can be achieved. Incidentally, in the case of a configuration in which Gain_Vdt is calculated when the motor is used, in the variable gain calculation unit 23 in FIG. 2, the calculation and storage of components of the Gain_Vdt map based on the d- and q-axis voltage command values Vd*, Vq* and Vd, Vq or based on the d- and q-axis integral terms is performed as needed.

Incidentally, if, of the factors determining the polarity during the dead time, factors can calculate Gain_Vdt that has a small impact on the change in polarity of motor current during the dead time in the half-cycle of the motor current and can sufficiently reduce the difference voltage even without consideration of those, those factors can be eliminated from the input parameters of the variable gain calculation unit 23.

A result of the base compensation voltage configured to be variable according to Gain_Vdt is shown in FIG. 7. As the dead time compensation voltages Vdtu, Vdtv, Vdtw are variable like FIG. 7(*c*), the difference between the inverter output voltage fluctuation during the dead time shown in (b) and the dead time compensation voltages Vdtu, Vdtv, Vdtw shown in (c) (the current half-cycle average) is almost zero.

Incidentally, in the above-described embodiment, Gain_Vdt is output from the Gain_Vdt map in the variable gain calculation unit 23; however, a part that the relationship between a change of an input parameter and a result of the above-described calculation of a component of the Gain_Vdt map can be represented in a calculation expression can be a calculation expression. Furthermore, by a combination with a publicly known example in which the dead time compensation voltages Vdtu, Vdtv, Vdtw are configured to be variable according to the phase of a fundamental wave of motor current (for example, a technology for configuring the dead time compensation voltage to be variable at a zero-crossing point of a fundamental wave of motor current), more appropriate dead time compensation voltages Vdtu, Vdtv, Vdtw in the current fundamental wave half-cycle are likely to be able to be calculated.

Second Embodiment

A second embodiment described below differs from the first embodiment only in the method of calculating components of the Gain_Vdt map, and the other configurations are the same as the first embodiment. In the present embodiment, it is configured to detect the polarity of motor current during the dead time over the half-cycle of a fundamental wave of the motor current and calculate components of the Gain_Vdt map on the basis of the time in the case of the same polarity as the fundamental wave and the time in the case of the polarity opposite to that of the fundamental wave.

In the calculation of components of the Gain_Vdt map, first, in a state in which Gain_Vdt=1 has been set, and the base compensation voltage has been output, input parameters are fixed to values in possible operating states in controlling the current of the motor, respectively. Then, in each half-cycle of the fundamental wave of the motor current, the time in the case where the motor current polarity during the dead time is the same polarity as the fundamental wave is measured as Tdt_same, and the time in the case where the motor current polarity during the dead time is different from the polarity of the fundamental wave is measured as Tdt_diff. Gain_Vdt is calculated by the following equation (6) on the basis of results of the calculation.

$$(Gain\_Vdt)=(Tdt\_same-Tdt\_diff)/(Tdt\_same+Tdt\_diff) \quad (6)$$

That is, with respect to the "total dead time=Tdt_same+Tdt_diff" in the half-cycle of the fundamental wave of the motor current, when the polarity of the fundamental wave of the motor current and the polarity of the motor current during the dead time are all the same polarity (when Tdt_diff=0), Gain_Vdt=1. Furthermore, when they are half the same (when Tdt_same=Tdt_diff), Gain_Vdt=0. Moreover, when none of them are the same (when Tdt_same=0), Gain_Vdt=-1.

In the measurement of Tdt_same and Tdt_diff, as shown in FIG. 8, a counter of which the value varies according to the polarity of the motor current during the dead time can be used. For example, a counter that increments its value when the polarity of the motor current during the dead time is positive and a counter that increments its value when the polarity of the motor current during the dead time is negative are provided. Then, Tdt_same and Tdt_diff over the half-cycle of the fundamental wave of the motor current are found from respective counter values of the counters. The counter values are cleared in each half-cycle, thereby Gain_Vdt can be found.

Furthermore, as for a state occurred in the course of controlling the current of the motor, calculating components of the Gain_Vdt map each time it occurs and storing the calculated values are repeated. As a result, Gain_Vdt in all the possible states are acquired. In this case, in the variable gain calculation unit 23, the measurement of Tdt_same and Tdt_diff and the calculation and storage of Gain_Vdt are performed as needed. The other matters concerning the calculation of Gain_Vdt other than the above are the same as in the first embodiment.

In the embodiments described above, as shown in FIGS. 2 and 7, the dead time compensation unit 20 acquires input parameters determining the polarity of the motor current L2 during the dead time in the half-cycle of the fundamental wave L1 of the motor current L2, and varies the dead time compensation voltages Vdtu, Vdtv, Vdtw according to the magnitude of the input parameters. As the input parameters, there are the power supply voltage HV, the motor rotation speed ω representing the operating state of the motor 50, the d- and q-axis current target values Id* and Iq*, the carrier frequency fs, the d- and q-axis motor inductances Ld and Lq relating to the motor characteristics, the motor phase resistance R, and the motor interlinkage flux ψa.

As a result, the dead time compensation voltages are configured to be variable according to factors determining the polarity during the dead time, and, even on the occurrence of a state in which in the half-cycle of the fundamental wave of the motor current, the amplitude of the fundamental wave is small with respect to high-frequency ripple amplitude of the motor current, and the polarity of the fundamental wave of the motor current is different from the polarity of the motor current during the dead time, the fluctuation in inverter output voltage during the dead time can be compensated properly.

For example, as shown in FIG. 2, the dead time compensation voltage is represented in the product of base compensation voltage and Gain_Vdt (a coefficient of variable capacitance). The base compensation voltage is set on the basis of the polarity of the fundamental wave of the motor current found based on a current target value, the ratio of the dead time to the switching cycle, and the magnitude of DC voltage. Furthermore, Gain_Vdt (the coefficient of variable capacitance) is set on the basis of the magnitude of acquired parameters and the difference between inverter output voltage fluctuation and the base compensation voltage in a state where the magnitude of dead time compensation voltage is set as base compensation voltage.

The difference can be calculated on the basis of the voltage (Vd, Vq) applied to the motor 50 in order to control the motor current like equation (3), or can be calculated on the basis of the integral term voltage like equation (5). In either case, there is no need to provide additional hardware to a conventional motor control device.

Furthermore, as shown in FIG. 8, Gain_Vdt (the coefficient of variable capacitance) can be set on the basis of the difference between Tdt_same as a first time in which the polarity of the motor current L2 during the dead time equals the polarity of the fundamental wave L1 and Tdt_diff as a second time in which the polarity of the motor current L2 during the dead time is different from the polarity of the fundamental wave L1.

Moreover, it can be configured that a Gain_Vdt map representing a correspondence relationship between the magnitude of various input parameters and Gain_Vdt is prepared in advance, and Gain_Vdt corresponding to the magnitude of an acquired input parameter is selected from the Gain_Vdt map.

Furthermore, in a configuration including a Gain_Vdt map on which components are set in advance, Gain_Vdt set on the basis of the difference can be calculated while the motor is driven, and Gain_Vdt having been set on the Gain_Vdt map in advance can be overwritten with the calculated Gain_Vdt. Accordingly, the improvement in the accuracy of dead time compensation can be achieved.

Incidentally, the present invention is not limited to the embodiments described above, and includes various modified examples. For example, the above embodiments are those described in detail to explain the present invention clearly, and do not always have to be limited to those including all the configurations. Furthermore, part of the configuration of one embodiment can be replaced with the configuration of another embodiment, or the configuration of one embodiment can be added to the configuration of another embodiment. Moreover, part of the configuration of each embodiment can be subjected to addition, elimination, and replacement of another embodiment.

REFERENCE SIGNS LIST

1 current command calculation unit
2 current control unit
3 three-phase conversion unit 4 PWM conversion unit
5 differential unit
6 dq-axis conversion unit
10 control unit
20 dead time compensation unit
21 current phase calculation unit
22 base compensation voltage calculation unit
23 variable gain calculation unit
30 DC power source
40 PWM inverter
50 motor

The invention claimed is:

1. A motor control device for an inverter including switching elements composing upper and lower arms to convert a direct-current voltage to an alternating-current voltage and apply the alternating-current voltage to a motor thereby controlling a current of the motor to be a current target value, the motor control device comprising
   a dead time compensation unit that compensates fluctuation in inverter output voltage during a dead time with each switching between the upper and lower arms by a dead time compensation voltage,
   wherein the dead time compensation unit acquires a parameter that determines a polarity of motor current during the dead time in a half-cycle of a fundamental wave of the motor current, and varies the dead time compensation voltage according to magnitude of the parameter; and
   wherein the dead time compensation voltage is product of a base compensation voltage and a coefficient of variable capacitance, the base compensation voltage being set based on a polarity of the fundamental wave of the motor current found based on the current target value, a ratio of the dead time to a switching cycle, and magnitude of the direct-current voltage, the coefficient of variable capacitance being set based on the magnitude of the acquired parameter and a difference between the fluctuation in inverter output voltage and the base compensation voltage in a state where magnitude of the dead time compensation voltage is the base compensation voltage.

2. The motor control device according to claim 1, wherein the difference is calculated based on a voltage applied to the motor to control the motor current.

3. The motor control device according to claim 1, wherein coefficients of variable capacitance are set to multiple different magnitude of parameters in advance, respectively, and
   the dead time compensation unit selects a coefficient of variable capacitance corresponding to the magnitude of the acquired parameter from the multiple coefficients of variable capacitance having being set in advance, and sets product of the base compensation voltage and the selected coefficient of variable capacitance to be the dead time compensation voltage.

4. The motor control device according to claim 3, wherein the dead time compensation unit calculates a coefficient of variable capacitance set based on the difference while the motor is driven, and replaces the coefficient of variable capacitance having been set in advance in correspondence to the parameter acquired while the motor is driven with the calculated coefficient of variable capacitance.

5. A motor control device for an inverter including switching elements composing upper and lower arms to convert a direct-current voltage to an alternating-current voltage and apply the alternating-current voltage to a motor thereby controlling a current of the motor to be a current target value, the motor control device comprising
   a dead time compensation unit that compensates fluctuation in inverter output voltage during a dead time with each switching between the upper and lower arms by a dead time compensation voltage,
   wherein the dead time compensation unit acquires a parameter that determines a polarity of motor current during the dead time in a half-cycle of a fundamental wave of the motor current, and varies the dead time compensation voltage according to magnitude of the parameter; and
   a measurement unit that measures a first time in which the polarity of the motor current during the dead time in the half-cycle of the fundamental wave of the motor current equals a polarity of the fundamental wave of the motor current and a second time in which the polarity of the motor current during the dead time in the half-cycle of the fundamental wave of the motor current is different from the polarity of the fundamental wave of the motor current,
   wherein the dead time compensation voltage is product of a base compensation voltage and a coefficient of variable capacitance, the base compensation voltage being set based on a polarity of the fundamental wave of the motor current found based on the current target value, a ratio of the dead time to a switching cycle, and magnitude of the direct-current voltage, the coefficient of variable capacitance being set based on the magnitude of the acquired parameter and a difference between the first time and the second time in a state where magnitude of the dead time compensation voltage is the base compensation voltage.

* * * * *